Aug. 22, 1967   M. G. WANINGER ETAL   3,337,696
DEVICE FOR SUPPORTING AND FEEDING ENERGY CONDUCTING
CABLES, CONDUITS, AND THE LIKE
Filed Sept. 3, 1963   8 Sheets-Sheet 1

INVENTORS
Matthias Gilbert Waninger, Deceased
By Ursula Waninger nee Jungbluth, Executrix
Josef Berkes By [signature]

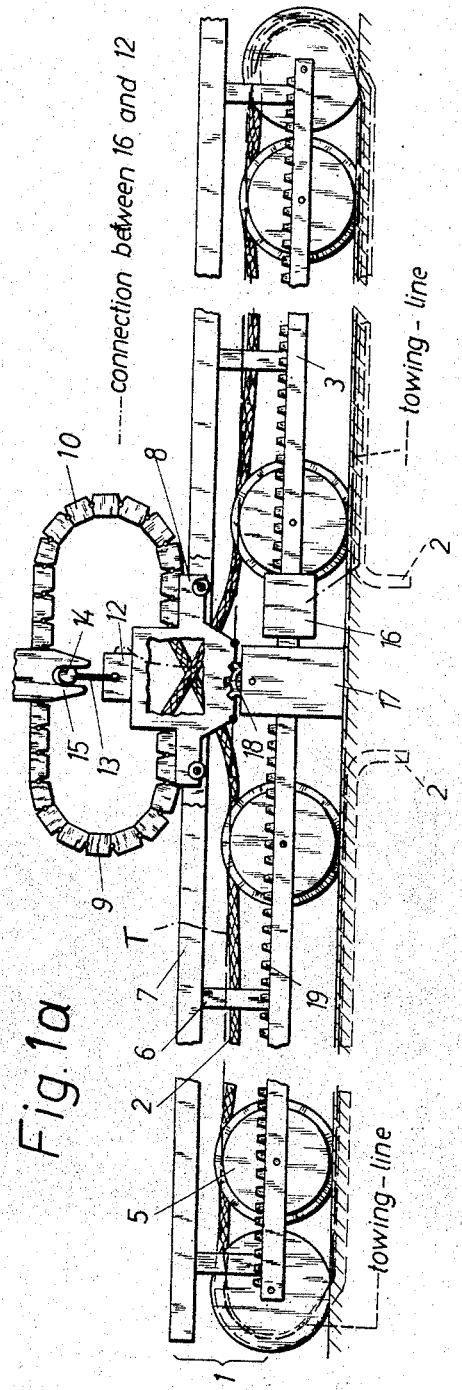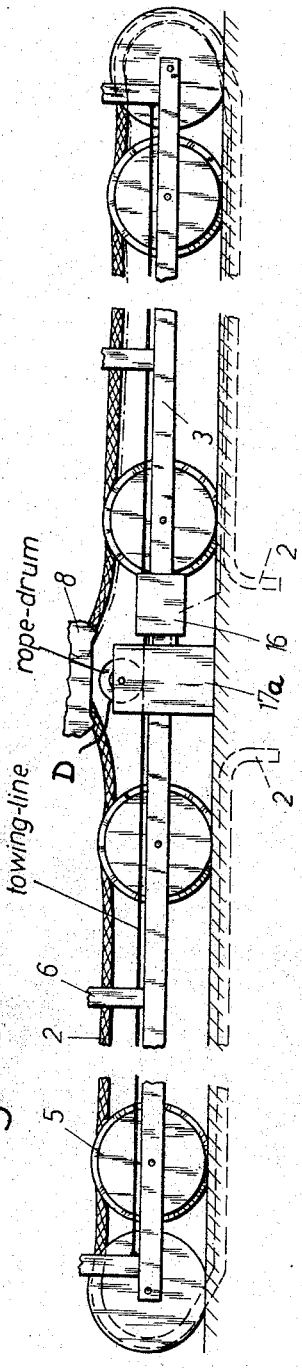

Aug. 22, 1967
M. G. WANINGER ETAL
3,337,696
DEVICE FOR SUPPORTING AND FEEDING ENERGY CONDUCTING
CABLES, CONDUITS, AND THE LIKE
Filed Sept. 3, 1963
8 Sheets-Sheet 3
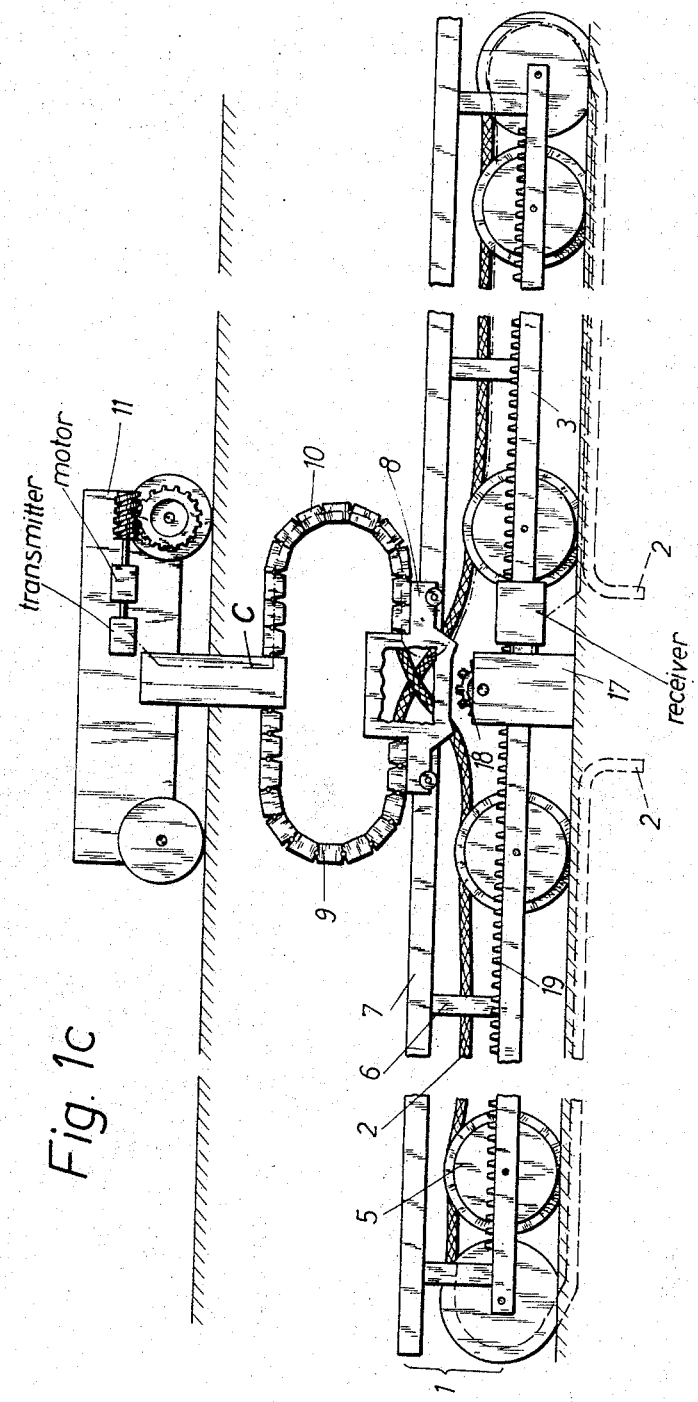
INVENTORS
Matthias Gilbert Waninger, Deceased
By Ursula Waninger nee Jungbluth, Executrix
Josef Berkes
By [signature]

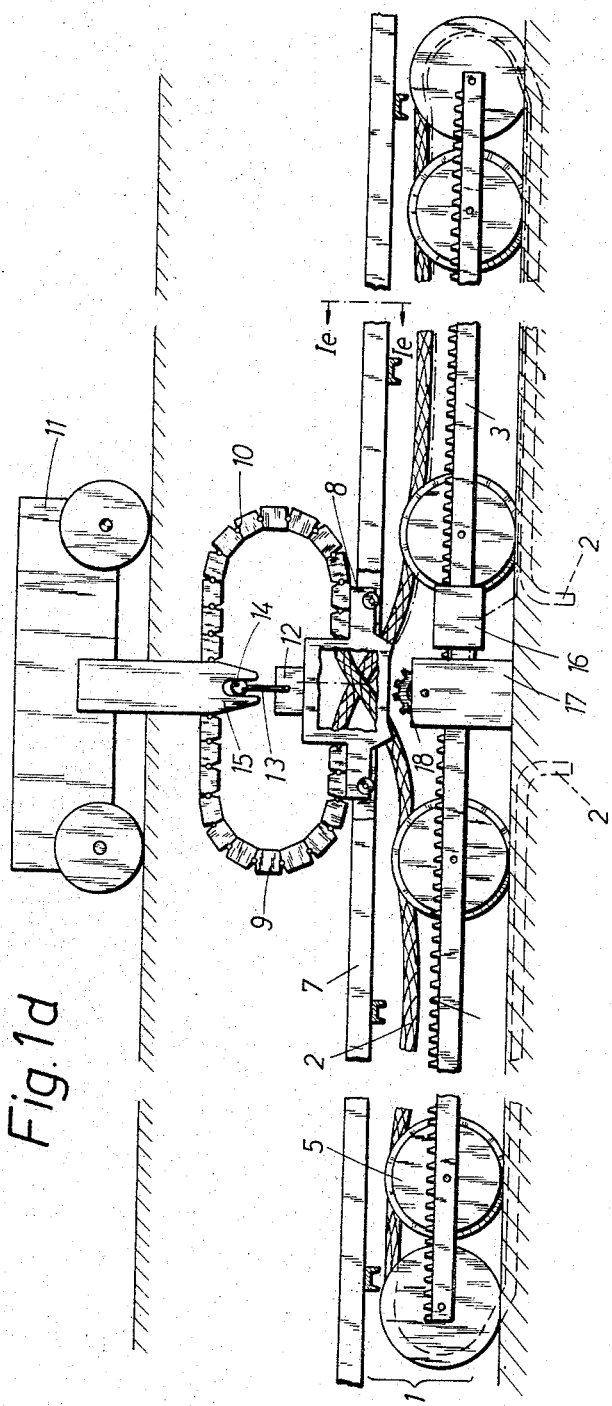
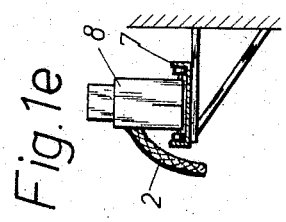

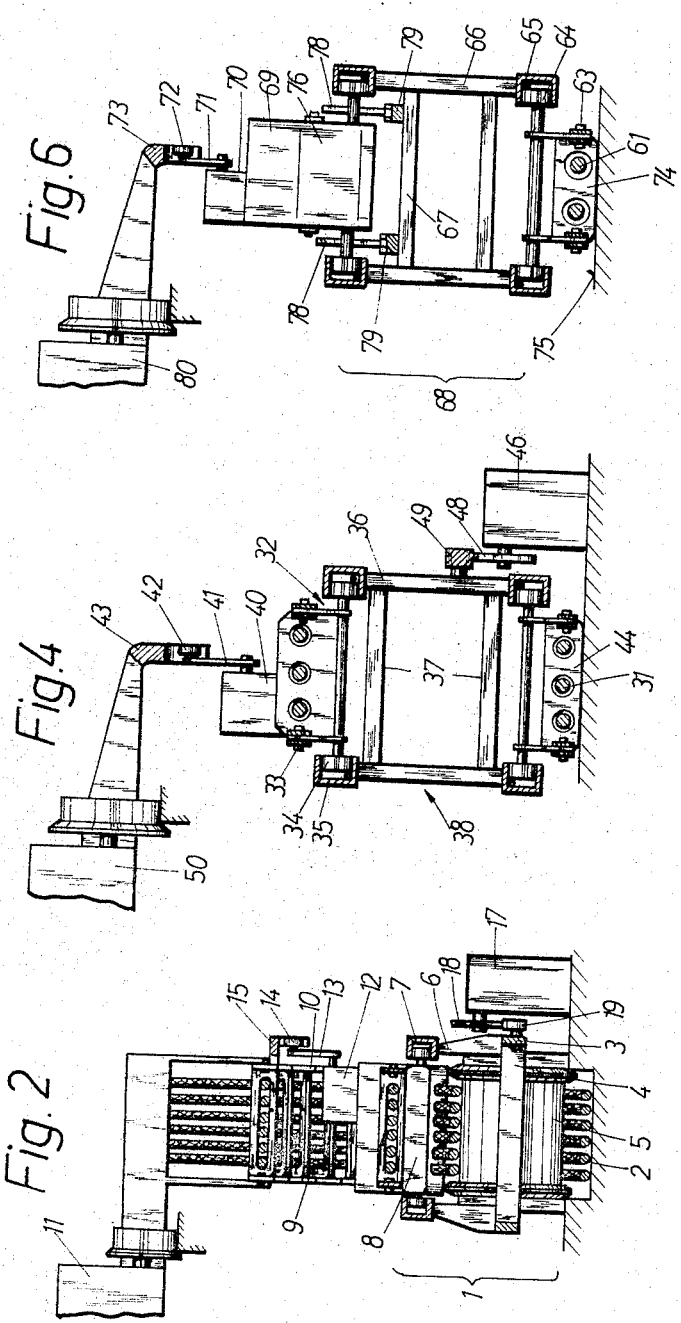

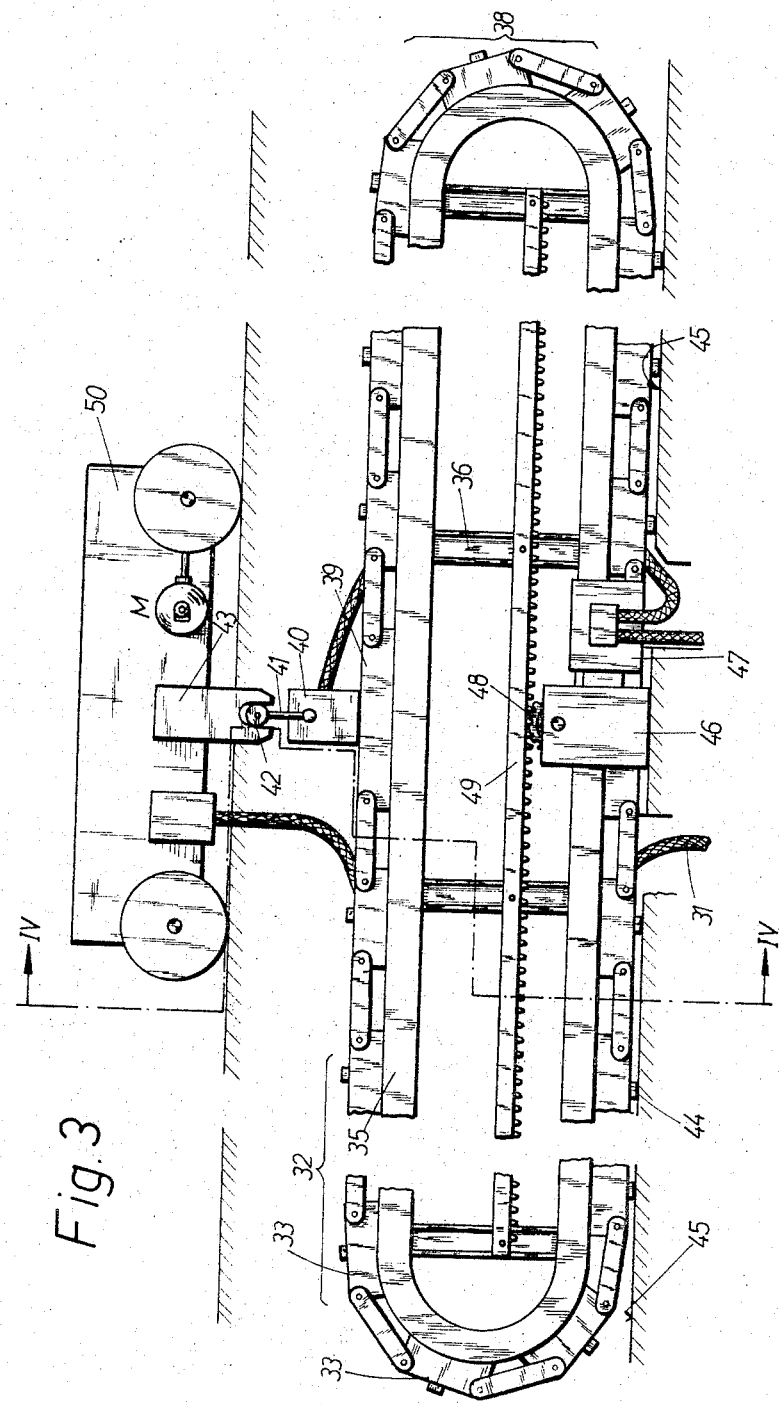

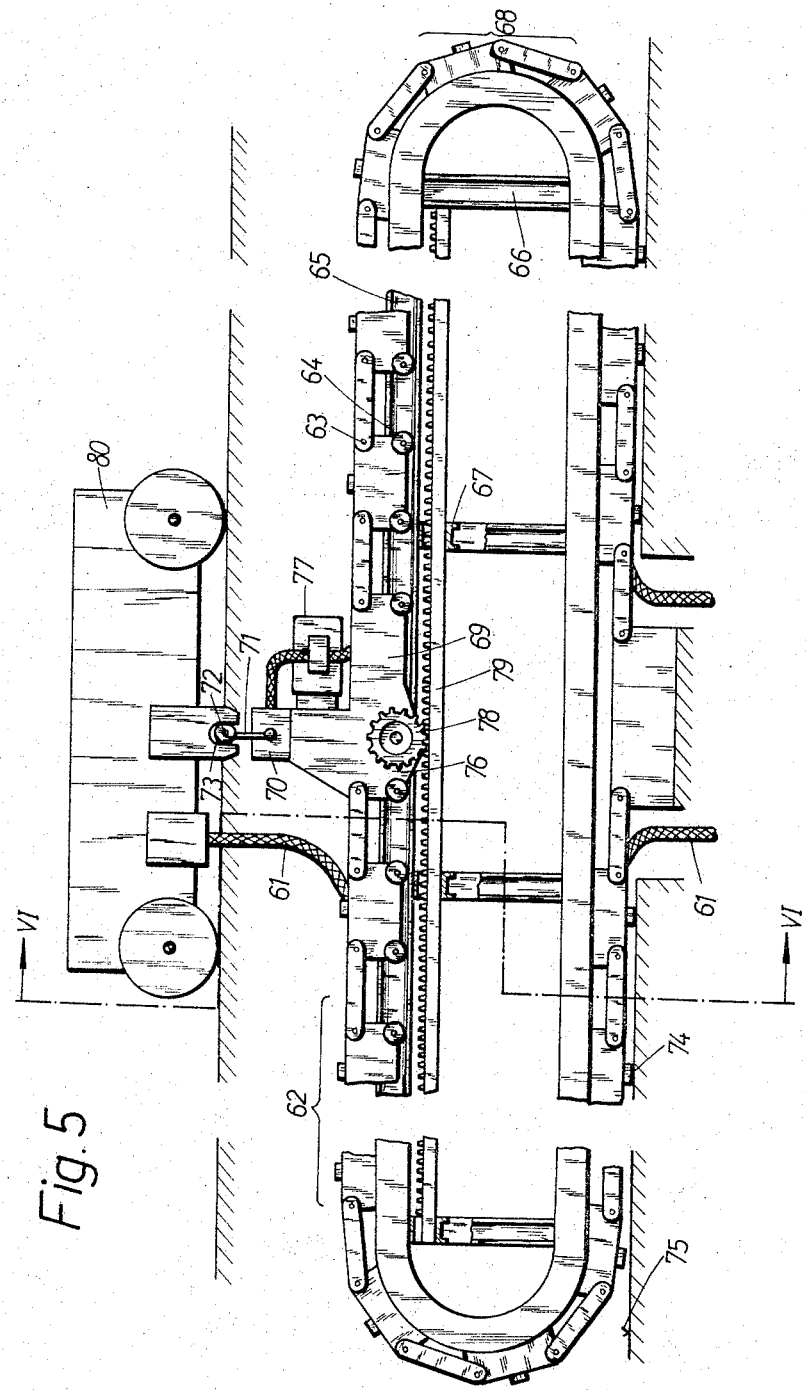

United States Patent Office 3,337,696
Patented Aug. 22, 1967

3,337,696
DEVICE FOR SUPPORTING AND FEEDING ENERGY CONDUCTING CABLES, CONDUITS, AND THE LIKE
Matthias Gilbert Waninger, deceased, late of Ettlingen, Baden, Germany, by Ursula Waninger, nee Jungbluth, executrix, Ettlingen, Baden, Germany, and Josef Berkes, Siegen, Westphalia, Germany, assignors to Kabelschlepp G.m.b.H., Siegen, Westphalia, Germany
Filed Sept. 3, 1963, Ser. No. 306,388
Claims priority, application Germany, Sept. 4, 1962, K 47,665
11 Claims. (Cl. 191—12)

The present invention relates to a device for guiding and supporting energy conductors such as cables, hoses and the like from a stationary connection to a movable consumer with a supporting carriage or supporting frame.

Movable consumers which have to move over a long path require a correspondingly long energy conducting device. The longer such a device is, the greater will be its inertia and its resistance to movement. Tthe forces required for overcoming said resistance and for overcoming said inertia when a change in speed occurs, have, with heretofore known energy conducting devices of the type involved, to be furnished by the consumer, for instance a crane trolley. These forces increase with increasing length of the energy conductor carrying device and may reach magnitudes which greatly impair the function of movement of the consumer. In this connection, the frequently unilateral suspension on the consumer has a disadvantageous effect, so that the consumer is liable to tilt about its vertical as well as its horizontal axis.

In view of the accelerating and retarding forces of the energy conductor carrying device when speed changes in the consumer occur, it is expedient to permit a relative movement between the energy conductor carrying device and the consumer in order to mitigate the accelerating shocks. This relative movement between the consumer energy conductor carrying device requires a loop in the cables or hoses supported by said carrying device. With heretofore carrying devices of the type involved, the cables or hoses are unprotected in the loops whereby they are liable to damage, particularly when said relative movement is great.

It is, therefore, an object of the present invention to provide a carrying device for the energy conductors, which no longer makes it necessary that the forces for overcoming the resistance to movement and inertia be furnished by the consumer.

It is also an object of this invention to provide a device as set forth in the preceding paragraph which will make it possible that the accelerating shocks can be absorbed by the cables or energy conductors without damage thereto.

These and other objects and advantages of the invention will appear more clearly from the following specification in connection with the accompanying drawings, in which:

FIG. 1 diagrammatically illustrates a side view of a cable carriage according to the invention, having a stationary drive therefor and being equipped with energy carrier conducting chains for protecting the loops in the cables;

FIG. 1a shows a modification over FIG. 1 in which a pulling rope or tow line for pulling a cable gathering carriage is provided;

FIG. 1b differs from FIG. 1 primarily in that the supporting carriage in contrast to FIG. 1 is not driven by a pinion rack arrangement but by a pulling rope and a motor operated drum;

FIG. 2 represents a section along the line II—II of FIG. 1;

FIG. 3 is a diagrammatic side view of a supporting frame with stationary drive therefor for an energy conductor carrying chain guided by rollers;

FIG. 4 is a section along the line IV—IV of FIG. 3;

FIG. 5 is a side view of a supporting frame with a drive therefor moving along in the chain;

FIG. 6 is a section along the line VI—VI of FIG. 5.

The arrangement for guiding and supporting energy conducting conduits and conductors according to the present invention is characterized primarily in that the supporting carriage or supporting frame has a drive of its own which, as far as the consumption of energy is concerned, is independent of the drive for the consumer but can be controlled by the latter. In view of this drive of its own for the supporting carriage or supporting frame, the above-mentioned drawbacks will be overcome.

According to one practical embodiment of the present invention, the supporting carriage or supporting frame is adapted to be driven through the intervention of gear racks, chains, or pull-ropes. The supporting carriage or frame may be controlled by means of follower control devices or an electric shaft.

If desired, the supporting carriage or supporting frame may also be controlled by means of an interval follower control device, in which instance contacts are provided on the path of movement of the consumer and on the path of movement of the supporting carriage or frame for respectively turning the drive on and off.

Between the carriage or supporting frame on one hand and the consumer on the other hand, there may be provided a loop in the energy carrying conductors or conduits for compensating for the movements. This loop is guided by additional guiding devices. The play of movement of the compensating loop is, with an interval follower control device, advantageously designed so great that it will correspond to at least one follower interval.

Figure 1:
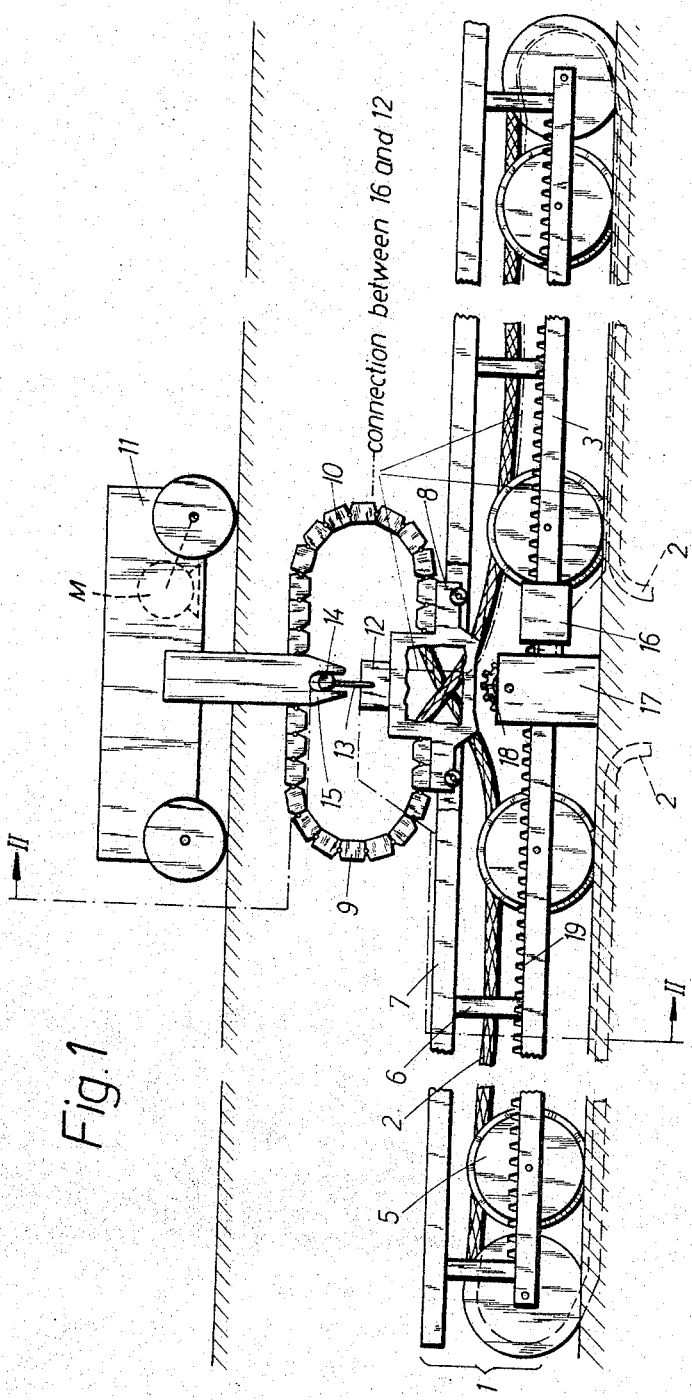
FIG. 1c shows an arrangement similar to that of FIG. 1 in which the lag control switch-motor arrangement of FIG. 1 has been replaced by a transmitter-receiver arrangement.
FIG. 1d shows an arrangement similar to that of FIG. 1a but differing therefrom primarily in that the gathering carriage is supported by stationarily arranged supporting means.
FIG. 1e is a section taken along the line 1e—1e of FIG. 1d.

Referring now to the drawings in detail and FIGS. 1 and 2 thereof in particular, the arrangement shown therein comprises a supporting carriage 1 for cables 2. This supporting carriage includes structural bearing rails 3 interconnected by transverse struts 4. Journalled in said bearing rails 3 are supporting drums 5 for the cables 2, said drums 5 simultaneously serving as rollers for the cable carriage 1. Mounted on said rails 3 are vertical supports 6 which carry supporting rails 7, for instance of U-shaped cross-section. A gathering carriage 8 which is guided in said supporting rails 7 gathers the movable cables 2 at the top of the carriage 1 to an oval for facilitating the function of the arrangement. Carriage 8 supports two energy carrier supply chains 9 and 10 for securing the cables 2 in the loop between cable carriage 1 and consumer 11.

In addition thereto, the carriage 8 has mounted thereon a lag control switch 12 the control lever 13 of which is equipped with a roller 14 engaging in a follower fork 15 of the consumer 11. The function of a follower control switch 12 is well known and disclosed for instance in German Patent No. 1,089,619, column 1, lines 23 to 37. Consumer 11 has a drive motor M of its own which is drivingly connected to the driving wheels of said consumer.

Arranged stationarily adjacent the cable carriage 1 is a drive therefor, for instance a preferably variable speed electric motor 16 of a standard design having associated therewith a mechanical step-down transmission 17 and a pinion 18. The driving pinion 18 meshes with a gear rack 19 (FIG. 2) connected to one of the rails 3 of the cable carriage 1. The direction and speed of the motor 16 and thereby the direction and speed of the cable carriage 1 depends on the shifting of the control lever 13 in one or the other direction, and on the shifting angle thereof. The carriage 8 may be pulled by the cables 2, or preferably by separate pulling ropes or cables in order to relieve the energy carrying cables 2. Such pulling rope or tow line T is shown in FIG. 1a and is connected to carriage 8 as shown in the drawing. The present invention is, of course, not limited to the construction just described but various modifications of the just-described arrangement are possible. Thus, in conformity with FIG. 1b, the gear rack 19 may be replaced by a pulling rope or tow line, in which instance the pinion 18 would be replaced by a cable or rope drum D. Cable 2 coming from the right (see FIG. 1b) or a cable parallel thereto is conveyed to the motor 16 and contains the control cable leading from the control switch 12 to the motor 16 and also contains the energy supply to motor 16.

Furthermore, the gear rack 19 may be replaced by a roller chain, in which instance the pinion 18 would be replaced by a sprocket wheel.

Also, instead of the motor 16, a receiver of the electric shaft may be employed. Such electric shaft is well known and described for instance in the book by D. H. Broins, "Werkzeuge and Werkzeugmaschinen" (Tools and Machine Tools), Part 2, pages 70 to 72, published by Karl Hansen Verlag, 1962. In this instance, the transmitter will be arranged in the consumer 11 and be driven by the motor thereof. With such an arrangement, the control switch 12 with lever 13 and roller 14 become superfluous. The follower fork 15 will then likewise not be required. Such an arrangement is shown in FIG. 1c in which a cable C leads from the transmitter to the receiver replacing the motor.

According to another modification shown in FIG. 1d, the supporting rails 7 instead of being connected to the cable carriage 1, may be arranged stationarily. In such an instance, the vertical supports 6 will be omitted. The supporting rails 7 will then be made so long as to approximately equal the length of the path of movement of the consumer 11. The chains 9 and 10 may also be replaced by other energy conductor supporting means. Instead of guiding the cables 2 directly over supporting drums 5, they may expediently be arranged in a corresponding chain which, in its turn, will then be carried by the supporting drums 5.

Referring now to the embodiments illustrated in FIGS. 3 and 4, the arrangement shown therein comprises a supporting frame 38 with a drive of its own. As will be seen from these figures, cables 31 are supported by a chain 32. At each side of the chain 32 there is provided a supporting roller 34 for each chain link 33. These rollers 34 guide chain 32 in oval-shaped rails 35 of U-shaped cross-section, with the open sides of said rails facing each other. The rails 35 are interconnected by vertical supports 36 and transverse struts 37 so as to form a supporting frame 38 which has the function of a supporting carriage. A gathering carriage 39 gathers the chains 32 which, in the upper chain section, pass from left and right to said carriage 39. Mounted on the gathering carriage 39 is a follower control switch 40 the control lever 41 of which has a roller 42 engaging the follower fork 43. Inasmuch as follower control switch 40 is well known in the art, a detailed description thereof appears to be superfluous.

The energy conductor supporting device shown in FIGS. 3 and 4 rests by means of protruding chain webs 44 on a supporting surface 45. Arranged adjacent the supporting surface 45 approximately in the center of the path of movement of said device there is provided a transmission 46 with a drive motor 47 which latter is preferably of the variable speed type. The transmission 46 includes a drive pinion 48 meshing with gear rack 49 which latter is connected to the vertical supports 36 of the supporting frame 38. The movement of a consumer 50, which likewise has a driving motor M of its own, is adapted to bring about a shifting of the control lever 41. Such control lever 41 represents a simple reversing switch which in its left-hand position turns on the motor 47 for leftward movement of the carriage whereas when occupying its right-hand position turns on said motor for rightward movement of the carriage. The direction and magnitude of this shifting movement determines the direction of rotation and speed of the drive motor 47 whereby also through pinion 48 and gear rack 49 the direction and speed of the supporting frame 38 will be determined. In this way the supporting frame 38 will, by its own power, follow the consumer 50 so that the latter will be relieved of additional loads. It will thus be seen from the above that with this embodiment the gathering carriage forms an extending chain link and part of the chain.

If desired, the above arrangement may be modified so that the supporting frame 38 is guided in stationary supporting rails, in which instance the supporting frame 38 is provided with supporting rollers. Such an arrangement is disclosed in assignee's copending application Ser. No. 306,369 (U.S. application of Matthias Gilbert Waninger, filed of even date herewith and entitled "Device for Supporting and Feeding Cables, Flexible Conduits, and the Like"). With such an arrangement, the stationary cable connection may be located at the top while the movable connection may be located at the bottom.

Furthermore, instead of a gear rack 49, a pull-rope or a roller chain may be employed. The driving pinion 48 may be replaced by a cable drum or by a sprocket wheel, in a manner similar to that shown in FIG. 1b.

The embodiment illustrated in FIGS. 5 and 6 shows an energy conductor supporting device similar to that of FIGS. 3 and 4 but with a movable drive. More specifically, with this embodiment the energy conductor supporting device comprises cables 61, a chain 62, chain links 63, rollers 64, rails 65 of U-shaped cross-section, vertical supports 66, transverse struts or webs 67, and a supporting frame 68. Instead of a gathering carriage there is provided a pull carriage 69. Carriage 69 has mounted thereon a follower control switch 70 the control lever 71 of which has a roller 72 engaging a follower fork 73. The device according to FIGS. 5 and 6 again rests on a supporting surface 75 by means of protruding chain webs 74.

The pull carriage 69 carries a transmission 76 with drive motor 77 which preferably is of the variable speed type. On the right-hand and left-hand side of the transmission 76 there is provided a driving pinion 78 each respectively meshing with a gear rack 79. It will be appreciated that the gear rack 79 is stationarily arranged while pinion 78 so to speak rolls on gear rack 79. With this embodiment two driving pinions 78 are employed in order to avoid tilting or canting of the pull carriage 69 in view of the short length over which it is guided. Consumer 80 is adapted to tilt the control lever 71. The tilting angle and the direction of movement of said lever 71 again determines the direction and speed of rotation of motor 77 and the direction of movement and speed of the supporting frame 68 which is pulled by the pull carriage 69 through the intervention of chains 62.

Also this last-mentioned embodiment may be modified in the manner described in connection with the modifications for the arrangement of FIGS. 1 to 4.

Figure 7:
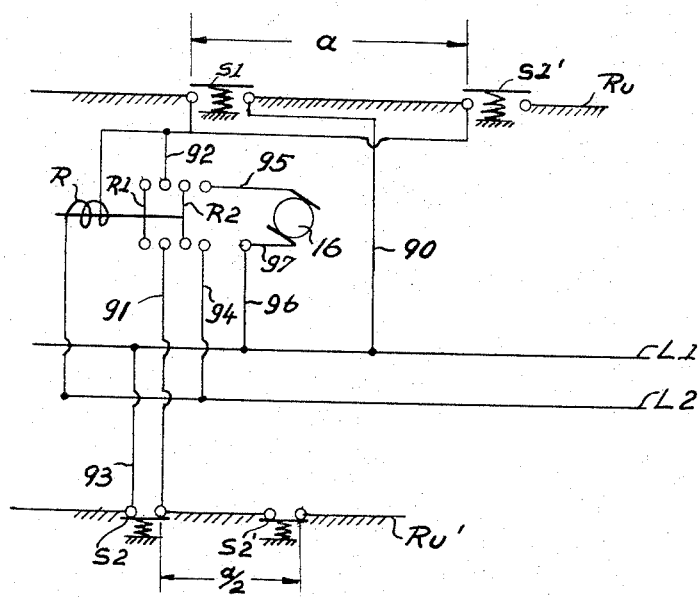
FIG. 7 is illustrates a control circuit for use in connection with the present invention.

According to a further modification which is diagrammatically shown in FIG. 7 and which is applicable to all of the embodiments shown in the drawings, a so-called interval follower control may be employed. In this instance, the switches 17, 40, or 70 are omitted. Instead, contacts spaced by a distance a are arranged on the path of movement of the consumer. These contacts switch on the drive 16, 17, 18; 46, 47, 48; 77, 78 for the energy conductor carrying device. On the path of movement of the supporting carriage or supporting frame there are likewise arranged contacts which, however, are spaced from each other by the distance a/2, which contacts turn off the drive. More specifically referring to FIG. 7, the control circuit illustrated therein shows the runway Ru for the consumer 11 and furthermore shows the runway Ru' for the carriage 1. Runway Ru has associated therewith a plurality of normally open switches S1, S1', etc. spaced from each other by a distance a and electrically arranged in parallel to each other. Runway Ru' has associated therewith a plurality of normally open switches S2, S2', etc. Spaced from each other by a distance a/2 and electrically arranged parallel to each other. The movable consumer 11 is adapted successively and temporarily to close the switches S1, S1', etc. when moving over runway Ru, whereas carriage 1 is adapted successively and temporarily to open switches S2, S2', etc., when moving over runway Ru'.

The circuit of FIG. 7 shows the network lines L1 and L2, and the motor 16 controlled by a relay R with its switch blades R1, R2. The operation of the circuit of FIG. 7 is as follows: It may be assumed that the consumer 11 has just closed switch S1. As a result thereof, relay R will be energized, the energizing current passing from line L1 through line 90, switch S1, relay R and line L2. Energization of relay R causes its blade R1 to establish electric communication between lines 91 and 92, thereby establishing a holding circuit for relay R. This holding circuit comprises line L1, line 93, normally closed switch S2, line 91, blade R1, line 92, relay R, and line L2. Thus, when the consumer 11 passes past and thus relieves switch S1, this not affect energization of relay R. Energization of relay R also establishes electric communication between lines 94 and 95, thereby closing the energizing circuit for motor 16 driving carriage 1. This last mentioned energizing circuit comprises line L1, lines 96, 97, motor 16, line 95, blade R2, line 94 and line L2. When carriage 1 eventually moves over and opens switch S2, the holding circuit for relay R is broken, so that relay R becomes de-energized. This in turn causes blades R1 and R2 to return to their open positions shown in FIG. 1 with the result that the energizing circuit for motor 16 is broken which stops shortly thereafter at which time carriage 1 is past switch S2, which means that switch S2 has closed again. The circuit is then ready to repeat the above outlined cycle, but this time for switch S1' when the consumer continues its movement in its previous direction, or again for switch S1, when the consumer should reverse its direction of movement.

The drive of the consumer is equipped with a direction switch which, in response to a change in the direction of rotation of the drive of the consumer, also changes the direction of rotation of the drive motor for the energy conductor carrying device. A loop in the conductors leading to the consumer is preferably arranged in an energy conductor supporting chain similar to the chains 9 and 10 in FIG. 1, which gives the consumer a play of movement of at least the length a, i.e. the distance between the contacts of the path of movement of the consumer. The drive of the energy conductor supporting device is so designed that the speed with which the conductor supporting device advances is greater than the speed with which it would advance without having its own drive. In other words, if, for instance, the consumer has the speed v, the speed of the supporting carriage of any energy conductor supporting device without drive of its own, is v/2. In the present instance, however, its drive for the energy conductor supporting device is so designed that the speed of the supporting carriage is, for instance, within the range of from 0.7v to v. Thus, when the consumer actuates a contact, the energy conductor supporting device will advance by an interval of the magnitude a/2.

It is, of course, to be understood that the present invention is, by no means limited to the particular construction shown in the drawings but also comprises any modifications within the scope of the appended claims.

What we claim is:

1. In a supporting structure including means for supporting and guiding energy conveying conductors, especially cables and hoses, from a stationary connection to a movable consumer having its own driving means: motor means drivingly connected to said supporting structure and representing said supporting structure's own motor means for driving the same, and control means operatively connected to said motor means and operable by a movable consumer for controlling said motor means.

2. In combination with a supporting structure including means for supporting and guiding energy conveying conductors, especially cables and hoses, from a stationary connection to a movable consumer having its own driving means: motor means stationarily arranged adjacent said supporting structure and drivingly connected thereto, and control means operatively connected to said motor means and operable by a movable consumer for controlling said motor means.

3. In a supporting structure including means for supporting and guiding energy conveying conductors, especially cables and hoses, from a stationary connection to a movable consumer having its own driving means: motor means supported by said supporting structure for driving the same, and control means operatively connected to said motor means and operable by a movable consumer for controlling said motor means.

4. An arrangement according to claim 1, which includes a pinion rack arrangement drivingly interconnecting said motor means with said supporting structure.

5. An arrangement according to claim 1, which includes a sprocket chain arrangement drivingly interconnecting said motor means with said supporting structure.

6. An arrangement according to claim 1, which includes a cable-cable drum arrangement drivingly interconnecting said motor means with said supporting structure.

7. In a supporting structure including means for supporting and guiding energy conveying conductors, especially cables and hoses, from a stationary connection to a movable consumer having its own driving means: motor means drivingly connected to said supporting structure and representing said supporting structure's own motor means for driving the same, and follower control means operatively connected to said motor means and operable in response to the movement of a movable consumer to control said motor means.

8. In a supporting structure including means for supporting and guiding energy conveying conductors, especially cables and hoses, from a stationary connection to a movable consumer having its own driving means: motor means drivingly connected to said supporting structure and representing said supporting structure's own motor means for driving the same, and electric shaft means operatively connected to said motor means and operable by the driving means of a movable consumer for controlling said motor means.

9. In combination with a movable consumer and runway means for said consumer: first motor means supported by said consumer for driving the same, a supporting structure including means for supporting and guiding energy conveying conductors from a stationary connection to said movable consumer, second motor means drivingly connected to said supporting structure and representing said supporting structure's own motor means for driving the same, first contact means associated with said runway means, additional runway means for supporting said supporting structure, second contact means, means operatively connected to said first and second contact means for starting said second motor means in response to the engagement of said first contact means and also operable to stop said second motor means in response to the engagement of said second contact means.

10. In a supporting structure including means for supporting and guiding energy conveying conductors, especially cables and hoses, from a stationary connection to a movable consumer having its own driving means: motor means drivingly connected to said supporting structure and representing said supporting structure's own motor means for driving the same, control means operatively connected to said motor means and operable by a movable consumer for controlling said motor means, carriage means supported by said supporting structure and movable relative thereto, and additional energy conductor guiding means confining a loop for guiding a compensating loop in energy conductors on said supporting structure prior to feeding said conductors to a movable consumer.

11. An arrangement according to claim 10, in which said control means is an interval follower control, and in which said additional energy conductor guiding means is so dimensioned that the play of movement of a compensating loop of energy conductors passing therethrough will be so great that it corresponds to at least one interval.

No references cited.

ARTHUR L. LA POINT, *Primary Examiner.*

S. T. KRAWCZEWICZ, *Assistant Examiner.*